Figure 7:
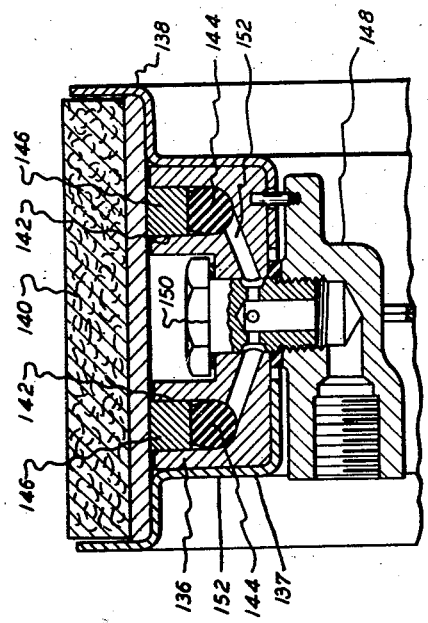

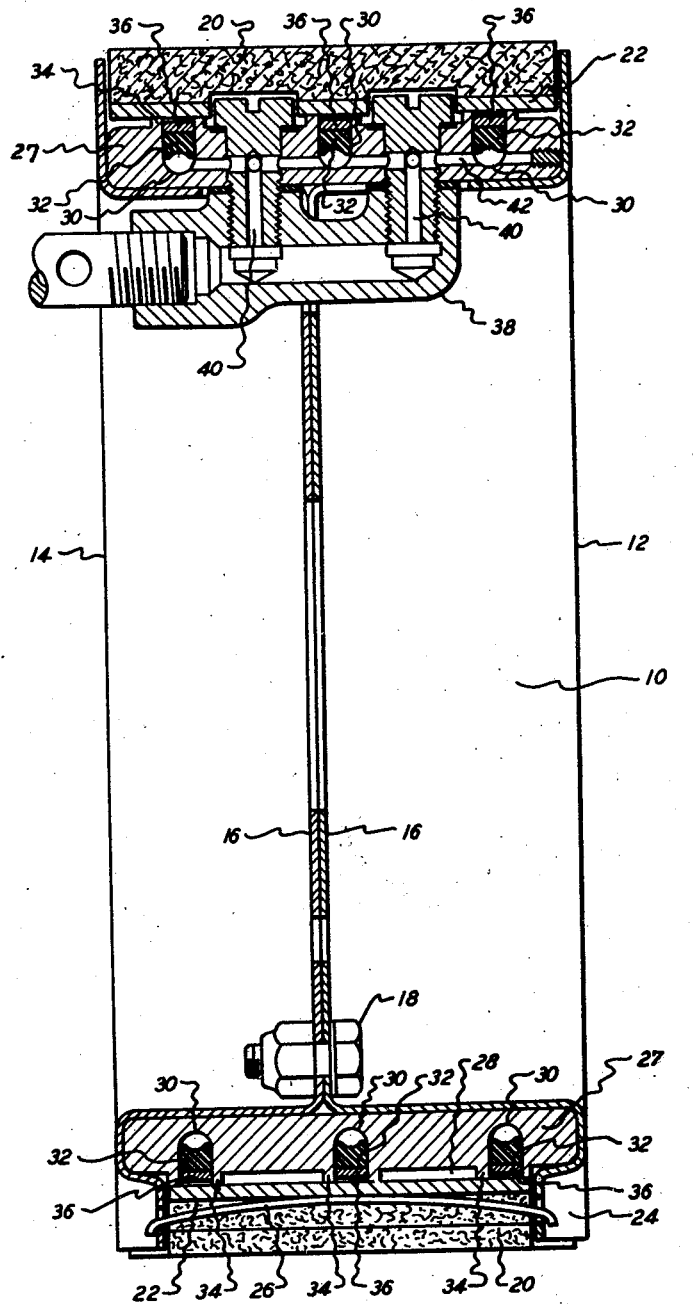
Fig_1

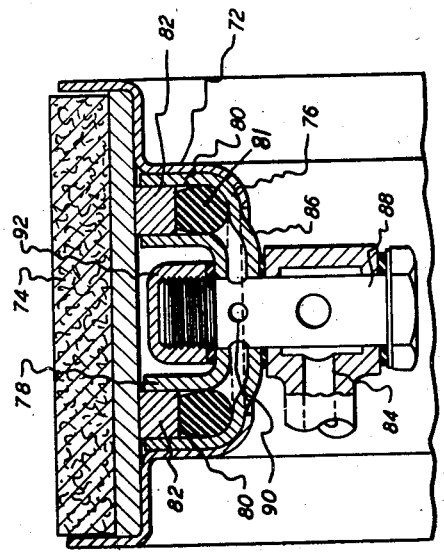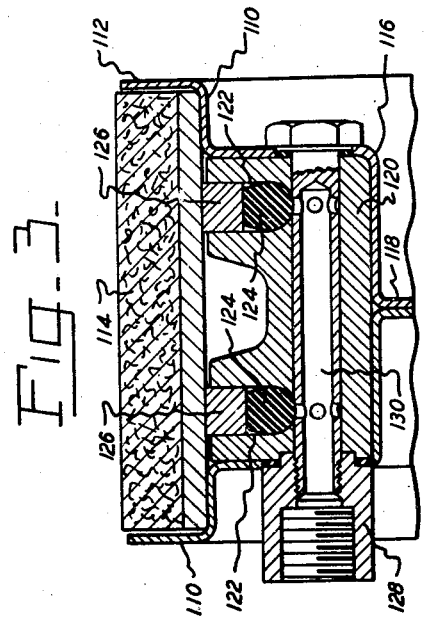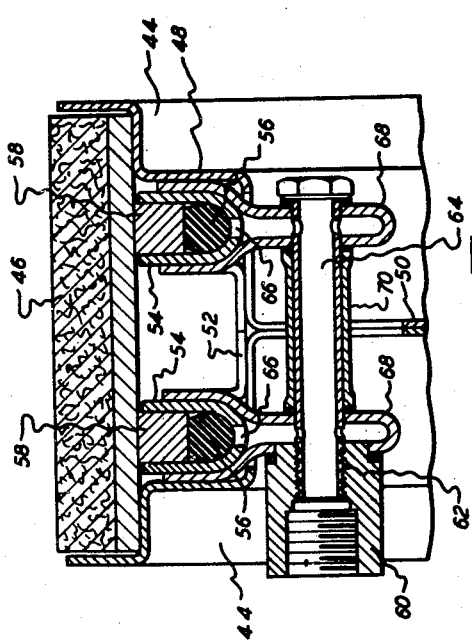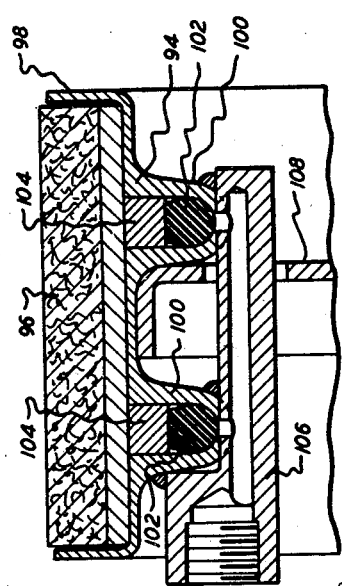

Inventor
ERWIN F. LOWEKE

Patented July 1, 1947

2,423,331

UNITED STATES PATENT OFFICE 2,423,331

HYDRAULIC BRAKE

Erwin F. Loweke, Jackson, Mich., assignor, by mesne assignments, to The B. F. Goodrich Company, Akron, Ohio, a corporation of New York Application May 6, 1944, Serial No. 534,423

2 Claims. (Cl. 188—152)

The present invention relates to improvements in brake structure, having particular reference to high pressure brakes of the type disclosed in the Hollerith copending application for Brake structure, Serial No. 526,698, filed March 16, 1944.

It is the object of the present invention to provide improved structural designs of brake structure of the type described which may be inexpensively manufactured by anyone of several standard principles of fabrication.

Other objects and advantages of the present invention are found in the details of construction and the combination and arrangement of parts.

In the drawings, wherein several forms of fabrication embodying the principles of the present invention are illustrated.

Figure 8:
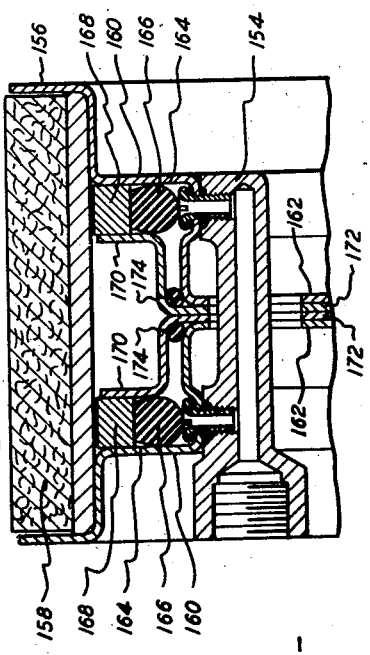
Figure 6:
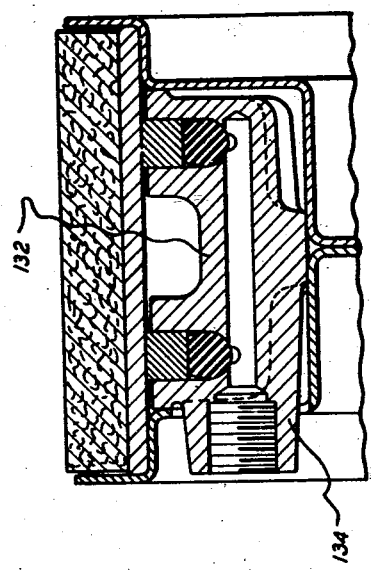

Fig. 1 is a vertical cross-sectional view of a radial brake embodying the present invention, Fig. 2 is a fragmentary cross-sectional view of a brake employing rolled strips carrying out the principles of the present invention, Fig. 3 is a view similar to Fig. 1 of another form of the invention employing rolled channels, Fig. 4 shows the use of a mill section for carrying out the principles of the present invention, Fig. 5 is a view similar to Fig. 1, illustrating the employment of a light metal forging, Fig. 6 is a view similar to Fig. 1, showing the present invention carried out through the use of a light metal casting, Fig. 7 is a view similar to Fig. 1, illustrating the employment of an extruded light metal section, and Fig. 8 is a view similar to Fig. 1 in which the structure comprises the use of stampings.

Referring to the drawings, in Fig. 1 the brake structure is in the form of a channeled rim member 10 comprising two annular sheet metal portions 12 and 14, each having inwardly extending flanges 16 secured by bolts 18 to form the torque flange. Arcuate brake blocks 20 are shown with backing plates 22. Spaced inwardly extending depressions 24 receive the torque from the brake shoes 20. Detractor springs 26 are supported from the depressions 24 and function to hold the brake blocks 20 in assembled as well as retracted positions, all in the manner fully disclosed in United States patent application Serial No. 275,355, filed May 24, 1939, now Patent No. 2,350,038, May 30, 1944.

In lieu of the low pressure expander tube, shown in the aforesaid patent application, an annular member 27 is supported within the channel of the rim. Extending inwardly from the outer face 28 are a plurality of circumferentially extending channels 30, in which are received circular rubber sealing rings 32 or the equivalent. It will be noted that the channels 30 extend into spaced circumferentially extending ribs 34. Fragmentary arcuate thrust members 36 are positioned between the sealing ring 32 and the backing plate carrying the brake blocks 20.

The structure for supplying hydraulic pressure against the sealing rings 32 to radially expand the same in the channels 30 and in this manner apply the brakes, comprises the fittings 38 supported by the annular member 27. Through ported studs 40, communication between the connector 38 and the channels 30 is through a transverse passage 42. It will be understood that high pressure fluid is admitted through the connector 38 through the channels 30, flowing circumferentially thereof to radially project the sealing rings 32 in the channels 30 to actuate the brake blocks 20.

Fig. 2 illustrates the manner in which rolled metal strips are utilized to fabricate brake structure according to the present invention. As shown, the rolled sections 44 define a channel in which the brake blocks 46 are supported, a drop center portion 48 and an inwardly extending torque flange 50. Piloted upon the drop center portion 48 is a rolled metal channel ring 52. Positioned between the channel member 52 and the sides of the drop center portion 48 are channel members 54 rolled from strip metal. The members 54 are annular in shape and carry the sealing rings 56, which are of rubber or other suitable material to permit radial expansion of the sealing ring within its channel 54. Positioned between the sealing rings 56 and the brake blocks 46 are segmental arcuate thrust members 58 which are guided for radial movement within the channels 54 under the influence of hydraulic pressure, admitted through the connections 60, directed into the channels 54 against the sealing rings 56 in the manner hereafter described.

As shown in Fig. 2, the connections 60 are threaded at 62 to receive the hollow bolt 64. At the point of fluid connection the channels 54 are apertured as at 66. Suitable connectors 68 formed of sheet metal and apertured to receive the bolt 64 are hydrogen welded or otherwise connected to the channels 54 in the manner shown in Fig. 2. The spacers 70 used in conjunction with suitable sealing washers enable the parts to be assembled in sealing relation through the take up on the bolt 64.

In Fig. 3, supported within the main channel rim of the brake structure 72, in which the segmental arcuate brake blocks 74 are supported, are nested annular channel members 76 and 78. The channels 76 and 78 may be welded in the position shown providing annular outwardly opening grooves 80, in which the annular sealing rings 81 are supported and react under the influence of hydraulic pressure against the thrust members 82 to radially project the brake blocks 74. The fluid connector 84 is connected to the aperture boss portion 86 of the channel 76 through a suitable ported hollow bolt 88 extending through an aperture 90 in the channel 78 and engaging with a nut 92.

A further arrangement, illustrated in Fig. 4, shows the brake structure fabricated from a mill section 94 in bar form and then rolled into an annular rim and butt welded. The segmental arcuate brake blocks 96 are shown supported in the main channel portion 98. An integral part of the web of the channel 98 are inner channel portions 100 in which the annular sealing rings 102 are supported and radially guided for radially expanding the brakes through the arcuate segmental thrust members 104. A suitable fluid connector 106 is shown welded in position in the channel 100. The torque flange for mounting the brake structure is indicated as 108 and is welded or otherwise suitably secured in the central web portion of the channel 98.

In Fig. 5 is shown a combination of rolled sheet metal parts and a forging to provide a brake structure according to the present invention. As shown, the main channel rim is made of two rolled sections 110 defining the main channel 112 for the brake blocks 114, having a drop center channel portion 116, with inwardly extending flanges 118 to constitute the torque flange. Within the channel 116 is a forged annular part 120 having channels 122 defined therein, in which are received the sealing rings 124 acting against the thrust members 126. The fluid under pressure is conducted to the connector 128 into which the hollow bolt 130 is threaded with suitable apertures connecting with the channels 122.

In Fig. 6 is an arrangement similar to Fig. 5 in which an annular casting 132 is provided in lieu of forgings shown in Fig. 5, the fluid connector 134 being an integral part of the main casting 132, the remainder of the structure being similar to that disclosed and described with reference to Fig. 5.

Fig. 7 illustrates a further combination of sheet metal, in formed sections, with an extruded section 136 supported upon the drop center channel 137 of the main sheet metal channel 138 in which the brake blocks 140 are supported. The integral channel portions 142 support the sealing rings 144 for radially expanding action against the thrust members 146 in the manner similar to that heretofore described with reference to other modifications of the invention. The hydraulic conductor 148 is supported in position and hydraulically connected with the channels 142 through the hollow bolt 150 communicating with passages 152 connecting with the channels 142.

Referring to the last illustrated form of the invention, in Fig. 8 is shown an assembly entirely of sheet metal stamping, with the exception of the cast fluid connector 154. As shown, the main structure consists of two complementary stampings 156 defining the main channel for the brake blocks 158 and a drop center channel 160 having inwardly extending flanges 162. The channels 164, in which the sealing rings 166 act against the thrust members 168, are defined by complementary stampings 170 having inwardly extending flanges 172 which with the flanges 162 collectively define the torque flange of the brake structure. Sealing rings 174 prevent fluid leakage from the chamber defined within which the sealing rings 166 are located.

Having thus described my invention, what I desire to secure and claim by Letters Patent is:

1. A radial brake structure comprising a pair of sheet metal dished parts of annular form and collectively defining an outer peripheral channel portion, a drop center channel portion and a radially extending torque flange, radially actuated brake blocks supported in said outer peripheral flange, an annular structure supported in said drop center portion and bridged by said brake blocks, annular channels defined in said structure supported in said drop center portion and opening towards said brake blocks, sealing rings supported in said last channel portions defining with the bottom thereof fluid chambers, and means for directing fluid under pressure into said chambers to radially expand said rings to actuate said brakes.

2. The brake structure defined in claim 1 wherein arcuate thrust members are disposed between said sealing rings and said block members.

ERWIN F. LOWEKE.

REFERENCES CITED

The following references are of record in the file of this patent:

UNITED STATES PATENTS

| Number | Name | Date |
|---|---|---|
| 2,390,311 | Kupiec et al. | Dec. 4, 1945 |
| 2,245,682 | Kerr | June 17, 1941 |

FOREIGN PATENTS

| Number | Country | Date |
|---|---|---|
| 4,464 | Great Britain | 1876 |